United States Patent
Dumur (10) Patent No.: US 10,106,271 B2
(45) Date of Patent: Oct. 23, 2018

(54) DEVICE AND A METHOD OF CONTROLLING ENGAGEMENT BETWEEN THE ENGINE AND A MAIN POWER TRANSMISSION GEARBOX OF AN AIRCRAFT

(71) Applicant: AIRBUS HELICOPTERS, Marignane (FR)

(72) Inventor: Guillaume Dumur, Salon de Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 114 days.

(21) Appl. No.: 15/434,296

(22) Filed: Feb. 16, 2017

(65) Prior Publication Data

US 2017/0240290 A1    Aug. 24, 2017

(30) Foreign Application Priority Data

Feb. 18, 2016  (FR) ..................... 16 00268

(51) Int. Cl.
*B64D 31/14* (2006.01)
*B64C 27/12* (2006.01)
(Continued)

(52) U.S. Cl.
CPC .............. *B64D 31/14* (2013.01); *B64C 27/12* (2013.01); *B64D 31/04* (2013.01); *B64D 31/06* (2013.01); *B64D 35/08* (2013.01)

(58) Field of Classification Search
None
See application file for complete search history.

(56) References Cited

U.S. PATENT DOCUMENTS 6,077,041 A    6/2000  Carter, Jr.
8,690,100 B2   4/2014  Birkner
(Continued)

FOREIGN PATENT DOCUMENTS

FR    793210     1/1936
GB    734450     8/1955
(Continued)

OTHER PUBLICATIONS

=rench Search Report for French Application No. FR 1600268, Completed by the French Patent Office, dated Nov. 4, 2016, 6 Pages.

*Primary Examiner* — Dirk Wright
(74) *Attorney, Agent, or Firm* — Brooks Kushman P.C.

(57) ABSTRACT

A method and a device for controlling a coupling mechanism arranged between an engine and a main mechanical power transmission gearbox MGB of a rotary wing aircraft. First determination means enable a first measurement to be taken giving the speed of rotation of said engine, which speed, on being compared with a setpoint speed for said engine, makes it possible to determine a "ready to engage" state for said coupling mechanism. Third determination means serve to determine a maximum torque that can be accepted by said MGB. While engaging the coupling mechanism, a control system for controlling said engine regulates said speed of rotation of said engine on said setpoint speed, while ensuring that the torque delivered by said engine is less than or equal to said maximum acceptable torque.

20 Claims, 4 Drawing Sheets

(51) Int. Cl.
    *B64D 31/06*     (2006.01)
    *B64D 35/08*     (2006.01)
    *B64D 31/04*     (2006.01)

(56) References Cited

U.S. PATENT DOCUMENTS

| | | | |
|---|---|---|---|
| 9,951,825 B2* | 4/2018 | Darrow | F16D 13/52 |
| 2017/0017241 A1* | 1/2017 | Gillett, Jr. | B64C 27/56 |
| 2017/0297679 A1* | 10/2017 | Elliott | B64C 19/00 |
| 2017/0321601 A1* | 11/2017 | Lafargue | B64D 27/24 |

FOREIGN PATENT DOCUMENTS

| | | |
|---|---|---|
| WO | 2011026478 A2 | 3/2011 |
| WO | 2011026478 A3 | 9/2011 |

\* cited by examiner

DEVICE AND A METHOD OF CONTROLLING ENGAGEMENT BETWEEN THE ENGINE AND A MAIN POWER TRANSMISSION GEARBOX OF AN AIRCRAFT

CROSS REFERENCE TO RELATED APPLICATIONS

This application claims priority to French patent application No. FR 16 00268 filed on Feb. 18, 2016, the disclosure of which is incorporated in its entirety by reference herein.

BACKGROUND OF THE INVENTION

(1) Field of the Invention

The present invention lies in the field of mechanical power transmission means for aircraft. The present invention lies in particular in the field of means for coupling-and-uncoupling two mechanical power transmission shafts, and intended for rotary wing aircraft.

The present invention relates to a device and a method of controlling coupling arranged between the engine and the main mechanical power transmission gearbox of an aircraft. The present invention also relates to a power plant provided with such means for controlling coupling.

(2) Description of Related Art

A rotary wing aircraft includes an engine, a main mechanical power transmission gearbox, at least one main rotor, generally serving to provide the aircraft with lift and propulsion, and optionally an anti-torque device for controlling yaw movements of the aircraft. The engine of the aircraft acts via the main transmission gearbox to drive rotation of each main rotor and optionally of the anti-torque device.

The engine may comprise one or more fuel-burning engines of various types, such as a piston engine or a gas turbine, also referred to as a turboshaft engine. In principle, a turboshaft engine comprises a plurality of stages for compressing admission air, a combustion chamber, and an expansion turbine having a plurality of stages. Each stage of the expansion turbine is driven in rotation by the gas produced by combustion. A turboshaft engine can thus be a linked-turbine engine or a free-turbine engine.

In a linked-turbine engine, the outlet shaft is secured to each stage of the expansion turbine and is also secured to the rotary shaft of each compression stage. Thus, the compression stages are driven in rotation by all of the stages of the expansion turbine, which also drives the outlet shaft. Mechanical coupling thus exists between the outlet shaft of a linked-turbine engine and the compression stages of that engine.

In a free turbine turboshaft engine, the expansion turbine generally comprises both initial expansion stages secured to the compression stages and also subsequent expansion stages that are secured to the outlet shaft. The initial stages of the expansion turbine are thus not mechanically connected to the subsequent stages of the expansion turbine, but are connected to the shaft of the compressor. Thus, the compression stages are driven in rotation by the initial stages of the expansion turbine, while the outlet shaft is driven by the subsequent stages of the expansion turbine, constituting the free turbine. Thus, no mechanical coupling exists between the outlet shaft of a free-turbine engine and the compression stages of that engine.

In a piston engine, the outlet shaft is secured to the crankshaft which is driven in rotation by the movements of the pistons. Mechanical coupling thus exists between the outlet shaft and both the crankshaft and also the pistons of the piston engine.

In addition, the outlet shaft of the engine of a rotary wing aircraft is generally connected mechanically to an inlet of a main mechanical power transmission gearbox in order to drive rotation of each main rotor and possibly of the anti-torque device. A rotary wing aircraft generally has only one main rotor provided with a plurality of first blades. The anti-torque device is traditionally a rotor provided with second blades and positioned at the end of a tail boom of the aircraft.

The outlet shaft from the engine of the aircraft is thus mechanically linked to a main rotor and its first blades, and possibly also to an anti-torque rotor and its second blades, via the main mechanical power transmission gearbox. Consequently, the outlet shaft is subjected to a high level of inertia due to the main mechanical power transmission gearbox, to the main rotor, and to its first blades, and possibly also to the anti-torque rotor and its second blades.

For simplification purposes, the acronym MGB is used in the description below to refer to the main gearbox for mechanical power transmission.

Since a free-turbine engine has no mechanical coupling between the outlet shaft and the compression stages, it can start without mechanically driving rotation of the outlet shaft, and as a result without mechanically driving rotation of the MGB, of the main rotor, and possibly also of the anti-torque rotor. Likewise, when a free-turbine engine is stopped, the MGB and the main rotor do not mechanically drive rotation of the compression stages. Specifically, the outlet shaft of a free-turbine engine can be linked mechanically to the MGB in permanent manner without any decoupling mechanism.

In contrast, a piston engine or a linked-turbine engine generally cannot start if they remain engaged with the MGB, since the inertia of the MGB and of the main rotor are too great.

A clutch type coupling mechanism is thus generally arranged between the outlet shaft of each engine and the MGB. Each engine is thus started on its own without driving rotation of the main rotor. Thereafter, the main rotor and optionally the anti-torque rotor are driven in rotation progressively by means of the coupling mechanism. The coupling mechanism is actuated by a pilot of the aircraft, e.g. via a lever arranged in the cockpit of the aircraft.

The coupling mechanism may also be used in the event of an engine stopping in order to decouple the outlet shaft of that engine mechanically from the MGB, thus preventing the main rotor from driving rotation of the engine after it has stopped.

By way of example, the coupling mechanism may be a belt clutch as used for example on so-called "ultra-light" rotary wing aircraft. The belt clutch is actuated by a pilot of the aircraft and the main rotor is driven by the outlet shaft of the engine in a manner that is therefore progressive so as to prevent the engine from stalling.

The coupling mechanism may also be a centrifugal clutch in which coupling is automatic and associated with the speed of rotation of the engine.

Examples of coupling mechanisms used on an aircraft are described in particular in the following documents: U.S. Pat. No. 6,077,041; FR 793210; GB 734450; and WO 2011/026478.

A coupling system makes it possible in particular to start the aircraft in two stages: initially, during a first stage, the engine is started, properly speaking, while its outlet shaft is mechanically decoupled from the MGB, and then, during a second stage, the outlet shaft of the engine is coupled mechanically with an inlet shaft of the MGB.

During the second stage of mechanical coupling, the difficulty is thus to avoid coupling the outlet shaft of the engine with the MGB too quickly and suddenly so as to avoid firstly any stalling of the engine and secondly any damage to the MGB, to the engine, and/or to the coupling mechanism. Specifically, sudden coupling can transmit too great an instantaneous level of power to the MGB, exceeding the capacities of the MGB. The MGB is then subjected to excessive torque leading to damage and associated maintenance operations on the MGB. The aircraft then needs to be taken out of service, giving rise to maintenance costs that can be considerable.

Furthermore, the MGB is particularly vulnerable while it is being coupled with the engine. Specifically, the MGB is generally lubricated by pumps that are driven by the MGB itself. As a result, its lubrication is not effective so long as the MGB is not being driven in rotation. Thereafter, lubrication becomes effective progressively when the MGB is driven in rotation. Thus, any coupling between the engine and the MGB that takes place too quickly can lead to high speeds of rotation in the MGB while its lubrication is still not completely effective, thereby degrading the components of the MGB.

Likewise, any coupling between the engine and the MGB that is too fast or too sudden can give rise to significant degradation to the engine and/or to the coupling mechanism.

In order to limit this risk during the mechanical coupling of the second stage, power is transmitted from the engine to the MGB in progressive manner.

The torque and the speed of rotation of the engine during this second stage of mechanical coupling must therefore be controlled manually by the pilot, e.g. by changing the rate at which fuel is injected into the engine. The pilot's objective is then to control fuel injection in such a manner as to keep the speed of rotation of the engine sufficient to drive the MGB and to avoid the engine stalling.

In general manner, each engine is controlled by a respective control system, e.g. in order to manage the stage(s) of starting and/or of regulating its speed of rotation.

Originally, a control system was a system that was merely mechanical or hydromechanical.

Nowadays, a control system is an electronic engine control unit (EECU) that manages the operation of the engine and in particular its starting and stopping.

On certain aircraft, the control system is an engine computer known as a full authority digital engine controller (FADEC). A FADEC engine computer has greater authority than an EECU, thereby limiting intervention on the part of the pilot in managing and operating the engine. A FADEC engine computer can in particular regulate the speed of rotation of the engine and also the torque delivered by the engine.

A FADEC engine computer also makes it possible to determine the current limits on utilization of the engine, while taking account of flying conditions and a variety of information derived from the operation of the engine of the aircraft and its environment.

However, most aircraft fitted with a coupling system between the engine and the MGB do not have a FADEC engine computer.

BRIEF SUMMARY OF THE INVENTION

An object of the present invention is to overcome the above-mentioned limitations and to facilitate starting the engine of an aircraft, in particular when the engine is a piston engine or a linked-turbine turboshaft engine. The present invention serves in particular to reduce significantly any risk of damaging the MGB during this stage of starting the engine by providing assistance during the stage of coupling the engine to the MGB or indeed by performing that automatically.

The present invention thus provides a device and a method for controlling a coupling mechanism between an engine and a main mechanical power transmission gearbox (MGB), and also a power plant including such a control device.

This method and device of the invention for controlling a coupling mechanism are intended in particular for a power plant of a rotary wing aircraft.

Such a control method of the invention for controlling a coupling mechanism between an engine and a main mechanical power transmission gearbox MGB is for use on an aircraft. The aircraft has at least one engine, an MGB, and at least one coupling mechanism, with a respective coupling mechanism being arranged between each engine and the MGB, and serving to engage an outlet shaft of each engine with a respective inlet shaft of the MGB.

A control system is connected to each engine in order to manage the operation of the engine. The control system serves in particular to regulate the speed of rotation of the engine and to control the torque transmitted by the engine. The term "control the torque" covers both verifying the value of the torque transmitted by the engine and also modifying the value of the torque. By way of example, such a control system may be a FADEC engine computer.

Each engine, each control system, each coupling mechanism, and the MGB together form the power plant of the aircraft.

The control method of the invention is remarkable in that it comprises the following steps:
determining the state of an engine including taking a first measurement giving a speed of rotation of the engine;
determining a "ready to engage" state for the coupling mechanism associated with the engine;
engaging the coupling mechanism associated with the engine;
determining a maximum torque acceptable by the MGB; and
regulating the engine so that the speed of rotation of the engine is regulated on a setpoint speed of rotation for the engine, while controlling the torque delivered by the engine so that it is less than or equal to the maximum torque acceptable by the MGB during the step of engaging the coupling mechanism.

The step of determining the state of an engine serves to define whether the engine has reached nominal operating conditions for enabling engagement of the coupling means and consequently engaging the outlet shaft of the engine with the inlet shaft of the MGB.

Specifically, if engagement is attempted when said nominal operating conditions have not been reached, then the engine runs at least the risk of stalling during engagement, and possibly also the risk of being damaged.

The engine may be a linked-turbine turboshaft engine. Under such circumstances, the step of determining the state of the engine comprises no more than taking the first measurement giving the speed of rotation of the linked-turbine. Specifically, the main criterion for determining that nominal operating conditions have been reached is verifying that the speed of rotation of the linked-turbine of the engine has reached a speed of rotation that is close to a setpoint speed of rotation.

The engine may equally well be a piston engine, e.g. using gasoline or diesel as fuel. Under such circumstances, the step of determining the state of the engine comprises firstly taking a first measurement giving the speed of rotation of the outlet shaft of the piston engine, and secondly taking a second measurement giving the temperature of a cooling liquid of the piston engine, and also a third measurement giving the temperature of a lubrication liquid of the piston engine. Specifically, before engaging a piston engine with the MGB, it is also necessary to ensure that the piston engine has reached a nominal operating temperature. This operating temperature is verified by measuring the temperature of the cooling liquid and the temperature of the lubrication liquid flowing in the piston engine.

This step of determining the state of the engine may be performed by first determination means for determining the state of an engine.

Under such circumstances, the first determination means for determining the state of an engine, when the engine is a linked-turbine turboshaft engine, comprises a first sensor, e.g. for taking a first measurement giving the speed of rotation of the outlet shaft of the linked-turbine.

When the engine is a piston engine, the first determination means for determining the state of an engine comprise a first sensor, e.g. for taking a first measurement giving the speed of rotation of the outlet shaft of the piston engine, together with second and third sensors for sensing temperature, serving respectively to measure the temperature of the cooling liquid and the temperature of the lubrication liquid of the piston engine.

Furthermore, the first determination means for determining the state of an engine may be incorporated in a control system for that engine, the control system being capable of accepting these measurements of the speed of rotation of the engine, and where appropriate of the temperatures of the cooling liquid and of the lubrication liquid of the piston engine.

A "ready to engage" state for the coupling mechanism associated with the engine can then be determined when the operating conditions are nominal. This step of determining the "ready to engage" state is performed by verifying at least that the difference between the speed of rotation of the engine and a setpoint speed of rotation is less than or equal to a first threshold.

Furthermore, if the engine is a piston engine, a "ready to engage" state is determined by verifying also that the second measurement giving the temperature of the cooling liquid of the engine lies in a first range of operating temperatures, and that the third measurement giving the temperature of the lubrication liquid lies in a second range of operating temperatures.

The first and second ranges are determined during testing and development of the piston engine. By way of example, the first threshold is equal to 2100 revolutions per minute (rpm), the first range has bounds of 60° C. and 110° C., and the second range has bounds of 50° C. and 130° C.

Furthermore, the first and second ranges may be ranges each having a single defined bound, preferably the low bound. For example, the first range may comprise temperatures greater than or equal to 60° C., and the second range may comprise temperatures greater than or equal to 50° C.

The setpoint speed of rotation for the engine may correspond to a nominal speed of rotation of the main rotor or to an idling speed of the main rotor.

This step of determining the "ready to engage" state may be performed by the first determination means for determining the state of an engine. This step of determining the "ready to engage" state may also be performed by dedicated second determination means for determining a "ready to engage" state.

Once the nominal operating conditions of the engine have been reached and verified, the "ready to engage" state is determined. A signal characterizing this "ready to engage" state can then be supplied by the second determination means for determining a "ready to engage" state, or where appropriate it can be supplied by the first determination means for determining a state of an engine. This signal may be in the form of a signal that is electrical or indeed optical, for example.

In a first implementation of the invention, the coupling mechanism is engaged automatically as soon as the "ready to engage" state is determined. The engagement thus takes place automatically, e.g. via control means for controlling engagement of the coupling mechanism as soon as the nominal operating conditions have been reached and verified. The progress of the engagement is then managed automatically by the control means firstly so as to avoid stalling of the engine, and secondly so as to avoid the engine delivering torque that is too great for the MGB.

This first implementation can advantageously optimize the time required for starting the engine and engaging it. Furthermore, the pilot of the aircraft is totally relieved of this task of managing the engagement of the engine with the MGB, and can concentrate on other tasks necessary for preparing the flight of the aircraft. Finally, this engagement operation is also made safe so as to guarantee that there is no degradation of the engine, of the coupling mechanism, or of the MGB, given that the engagement operation is performed in automatic manner.

In a second implementation of the invention, the coupling mechanism is engaged automatically when the "ready to engage" state is determined and after that state has been confirmed by a pilot of the aircraft. The method in this second implementation includes various additional steps situated between determining a "ready to engage" state and engaging the coupling mechanism.

Firstly, a first additional step is performed of information means of the aircraft supplying "ready to engage" information to a pilot of the aircraft as soon as the "ready to engage" state is determined. Thereafter, a second additional step is performed of the pilot activating an order for engaging the coupling mechanism by means of action means arranged in a cockpit of the aircraft.

The information means may be display means, such as a screen or an indicator light, serving to display the "ready to engage" information. The information means may also supply the information in audible form. By way of example, the action means may comprise a pushbutton arranged on the instrument panel of the aircraft. Thus, by acting on the action means after taking cognizance of the "ready to engage" information, the pilot can determine the moment at which the operation of engaging the coupling mechanism starts.

Engagement is thus performed automatically by the control means for controlling engagement of the coupling mechanism as soon as those two conditions are combined, i.e. as soon as the "ready to engage" state has been determined and the pilot has activated the action means. By way of example, the action means deliver an engagement signal in electrical or optical form to the control means. The progress of engagement is once more managed automatically by control means so as to avoid the engine stalling and so as to avoid the engine delivering too great a torque.

This second implementation serves advantageously to relieve the pilot of the aircraft of this task of managing the engagement, and also to make this engagement operation safe. Furthermore, the pilot can select the moment at which the engine is engaged with the MGB, e.g. so as to avoid driving rotation of the MGB when aircraft takeoff is not imminent. Specifically, the engine may be started so that the rotary wing aircraft is electrically powered, e.g. for the purpose of preparing its flight, without the main rotor being driven in rotation.

In a third implementation of the invention, the coupling mechanism is engaged manually by the pilot of the aircraft once the "ready to engage" state has been determined. In this third implementation the method includes an additional step situated between the step of determining a "ready to engage" state and the step of engaging the coupling mechanism. This additional step comprises information means of the aircraft supplying the "ready to engage" information as soon as the "ready to engage" state is determined. As above, the "ready to engage" information may be supplied in visible or audible form.

The coupling mechanism is then engaged manually by a pilot using an engagement lever arranged in the cockpit of the aircraft. The means for controlling engagement of the coupling mechanism include the engagement lever.

The pilot must then personally manage the progress of engagement in order to cause the engine to become engaged progressively with the MGB. Nevertheless, in order to assist the pilot in achieving this engagement, the engine is regulated at its setpoint speed of rotation for the engine, while also ensuring that the torque delivered by the engine remains less than or equal to the maximum torque acceptable by the MGB. As a result, the control method of the invention for controlling a coupling mechanism serves advantageously to limit any risk of the engine stalling, and indeed to avoid such stalling, and secondly to avoid the engine delivering too great a torque that might lead to damage in particular of the MGB, of the engine, or indeed of the coupling mechanism.

In the first and second implementations of the invention, the coupling mechanism is engaged automatically by the control means.

During the engagement operation, the coupling mechanism may be regulated by controlling an engagement speed. The term "engagement speed" is used to mean the speed of moving components in the coupling mechanism that serve to engage the outlet shaft of the engine with the inlet shaft of the MGB. For example, if the coupling mechanism is a disk clutch, the engagement speed is the speed at which disks secured respectively to the outlet shaft of the engine and to the inlet shaft of the MGB move towards each other.

The coupling mechanism may be regulated as a function of the speed of rotation of the engine and as a function of the setpoint speed of rotation for the engine. For example, by way of default, the engagement speed is equal to a predefined maximum speed and is kept equal to this predefined maximum speed so long as the difference between the setpoint speed of rotation of the engine and the speed of rotation of the engine is less than or equal to a predefined second threshold. This engagement speed can then be reduced if the speed of rotation of the engine slows and departs from the setpoint speed of rotation, the difference between the setpoint speed of rotation and the speed of rotation of the engine becoming greater than this predefined second threshold. This second threshold may be equal to the first threshold.

This regulation of the coupling mechanism may also be performed as a function of the torque delivered by the engine and of the maximum torque that is acceptable by the MGB. For example, by way of default, the engagement speed is equal to the predefined maximum speed and is kept equal to this predefined maximum speed so long as the difference between the maximum torque that is acceptable by the MGB and the torque delivered by the engine is greater than or equal to a predefined third threshold, the torque delivered by the engine being less than the maximum acceptable torque. This engagement speed can then be reduced if the torque delivered by the engine comes closer to the maximum torque acceptable by the MGB and if the difference between the maximum torque acceptable by the MGB and the torque delivered by the engine is less than this predefined third threshold.

The method of the invention for controlling a coupling mechanism can thus optimize the time required for engagement so as to minimize the time between starting the engine of a rotary wing aircraft, and the aircraft taking off. By way of example, such optimization is obtained by giving precedence to a maximum engagement speed and by increasing the value of the second threshold and/or reducing the value of the third threshold. By way of example, such conditions may be used on military missions requiring the aircraft to takeoff rapidly.

The method of the invention for controlling a coupling mechanism can also serve to optimize the lifetimes of the engine, of the coupling mechanism, and of the MGB. Such optimization is obtained by applying loading progressively to the engine, to the coupling mechanism, and to the MGB during this coupling operation. By way of example, such conditions correspond to a second threshold that is low so as to avoid a speed of rotation of the engine that is too low, and a third threshold that is high so as to avoid the engine driving the MGB with torque close to the maximum torque that is acceptable by the MGB.

Furthermore, during the engagement operation, the coupling mechanism may also be regulated by controlling a coupling position. The term "coupling position" is used to designate the position of moving components of the coupling mechanism. For example, if the coupling mechanism is a disk clutch, the coupling position is the relative position of the disks forming the coupling mechanism, these disks being secured respectively to the outlet shaft of the engine and to the inlet shaft of the MGB. Under such circumstances, the coupling speed is constant and predefined while the coupling position changes, or indeed is zero when the coupling position does not change.

Furthermore, the maximum torque that can be accepted by the MGB may be determined as a function of taking a fourth measurement giving the temperature of a lubrication liquid of the MGB, and a fifth measurement giving the pressure of the lubrication liquid of the MGB. The fourth measurement giving the temperature of the lubrication liquid of the MGB is taken by a fourth sensor for sensing temperature, and the fifth measurement giving the pressure of the lubrication liquid of the MGB is taken by a fifth sensor for sensing the pressure of the lubrication liquid of the MGB.

The maximum torque acceptable by the MGB can then be determined on the basis of these two measurements and on the basis of previously-defined relationships for variation in this maximum torque that can be accepted by the MGB. These relationships are established while testing the power plant on a test bench or while performing test flights with an aircraft fitted with the power plant. The tests may also include simulations of the operation of the power plant. These relationships may be represented in the form of charts, for example.

Nevertheless, the fifth measurement giving the pressure of the lubrication liquid of the MGB may be replaced by a sixth measurement giving the speed of rotation of the MGB. Specifically, the lubrication liquid of the MGB is driven by a pump, which is itself driven in rotation by the MGB. In addition, the speed of rotation of the pump can be used to quantify the pressure of the lubrication liquid of the MGB and it is proportional to the speed of rotation of the MGB. Thus, this sixth measurement giving the speed of rotation of the MGB serves to quantify the pressure of the lubrication liquid of the MGB. The maximum torque that can be accepted by the MGB can then be determined on the basis of this sixth measurement giving the speed of rotation of the MGB and of the fourth measurement giving the temperature of the lubrication liquid of the MGB. This sixth measurement giving the speed of rotation of the MGB is taken by means of a sixth sensor for sensing speed.

Furthermore, in a variant of the method of the invention for controlling a coupling mechanism, the maximum torque that is acceptable by the MGB can be determined solely on the basis of a fifth measurement giving the pressure of the lubrication liquid of the MGB. The maximum acceptable torque is then equal to a reduced torque if the fifth measurement giving the pressure of the lubrication liquid of the MGB is less than or equal to a fourth threshold, while the maximum acceptable torque is equal to a maximum torque if the fifth measurement giving the pressure of the lubrication liquid of the MGB is greater than the fourth threshold.

Finally, in parallel with engaging the coupling mechanism and with determining the maximum torque that is acceptable by the MGB, regulating the engine makes it possible to control the operation of the engine. This regulation of the engine is performed by the engine control system and it serves to regulate the speed of rotation of the engine on a setpoint speed of rotation for the engine and also to control the torque delivered by the engine so as to ensure that it is less than or equal to the maximum torque that can be accepted by the MGB while engaging the coupling mechanism.

Engaging the coupling mechanism associated with the engine, determining the maximum torque acceptable by the MGB, and regulating the engine are performed simultaneously.

The present invention also provides a device for controlling a coupling mechanism between an engine and a main mechanical power transmission gearbox MGB for an aircraft, the aircraft having at least one engine, a respective control system for each engine, an MGB, and at least one coupling mechanism, with a respective coupling mechanism being arranged between each engine and the MGB serving to engage an outlet shaft of the engine with an inlet shaft of the MGB.

The device for controlling the coupling mechanism is suitable for performing the above-described control method for controlling the coupling mechanism, and it comprises:

first determination means for determining the state of the engine, being provided with a first sensor for taking a first measurement giving the speed of rotation of the engine;

second determination means for determining a "ready to engage" state for the coupling mechanism;

third determination means for determining a maximum torque that is acceptable by the MGB; and control means for controlling engagement of the coupling mechanism associated with the engine.

Each engine control system may be a FADEC engine computer. A FADEC engine computer can act at all times to guarantee that the power and the torque that are delivered do not damage the devices present downstream from the engine, and in particular the MGB. The FADEC engine controller thus serves firstly to guarantee proper operation of the power transmission system of the aircraft and to ensure safe flight of the aircraft, and secondly to authorize a long lifetime for the power transmission system and in particular for the MGB.

The present invention also provides a power plant for a rotary wing aircraft. The power plant includes at least one engine, a respective control system for each engine, a main mechanical power transmission gearbox, at least one coupling mechanism, and a device as described above for controlling each coupling mechanism. A respective coupling mechanism is arranged between each engine and the MGB and enables an outlet shaft of each engine to be engaged with a respective inlet shaft of the MGB.

BRIEF DESCRIPTION OF THE DRAWINGS

The invention and its advantages appear in greater detail from the context of the following description of embodiments given by way of illustration and with reference to the accompanying figures, in which.

DETAILED DESCRIPTION OF THE INVENTION

Elements present in more than one of the figures are given the same references in each of them.

Figure 1:
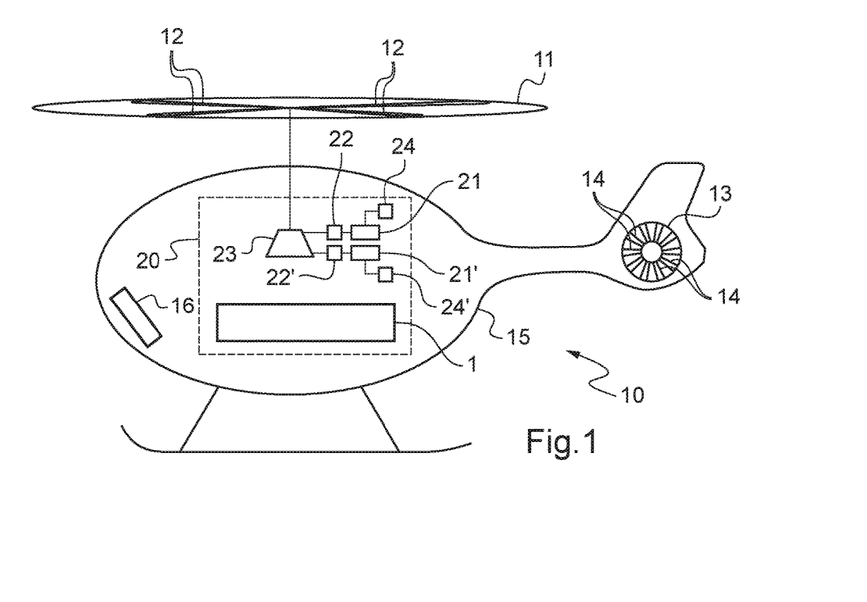
FIG. 1 shows an aircraft provided with a power plant of the invention.
Figure 2:
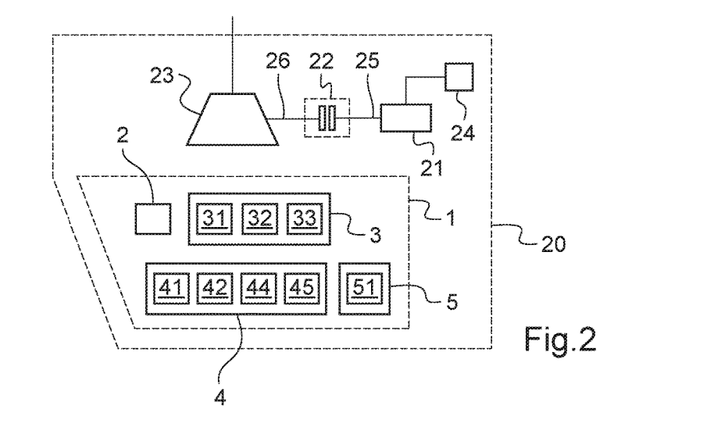
FIGS. 2 to 4 show three embodiments of the power plant.
Figure 3:
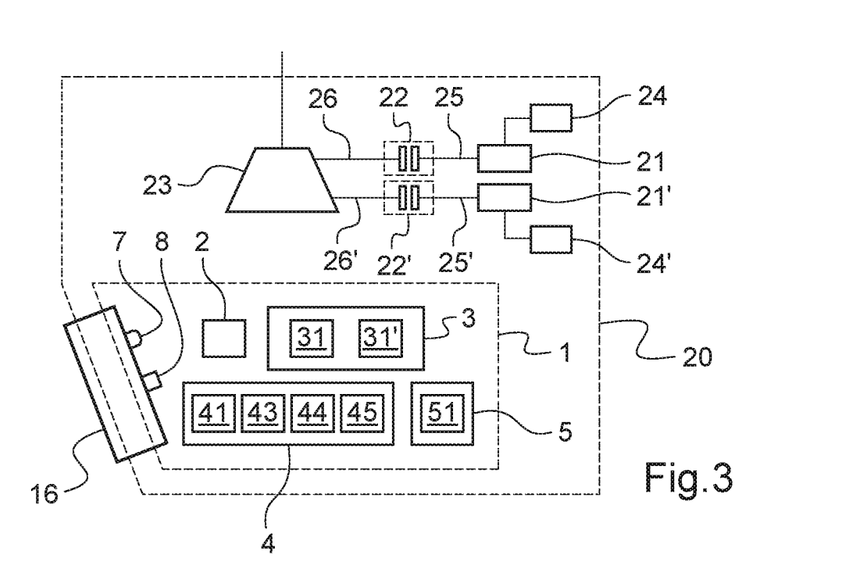
Figure 4:
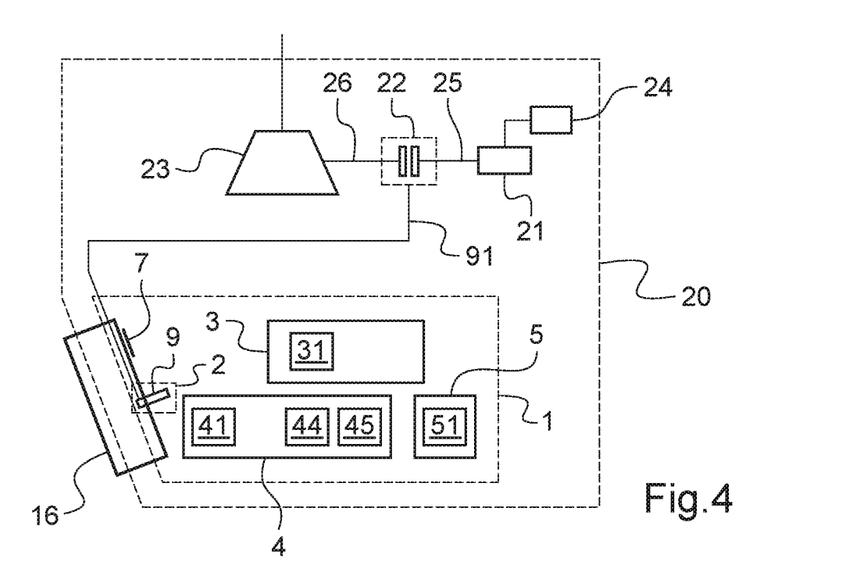

FIG. 1 shows a rotary wing aircraft 10 having a fuselage 15, a main rotor 11 with first blades 12, an anti-torque rotor 13 with second blades 14, an instrument panel 16, and a power plant 20 driving rotation of the first blades 12 of the main rotor 11 and the second blades 14 of the anti-torque rotor 13. Three different embodiments of the power plant 20 are shown in FIGS. 2 to 4.

These three different embodiments of the power plant 20 nevertheless include in common at least one engine 21, 21', a respective control system 24, 24' for each engine 21, 21', a single main mechanical power transmission gearbox MGB 23, at least one coupling mechanism 22, 22', and a single device 1 for controlling all of the coupling mechanisms 22, 22'. Each control system 24, 24' is a FADEC engine computer.

A respective coupling mechanism 22, 22' is arranged between each engine 21, 21' and the MGB 23. Each coupling mechanism 22, 22' thus enables an outlet shaft 25, 25' of an engine 21, 21' to be engaged with an inlet shaft 26 of the MGB 23. As a result, each engine 21, 21' can drive rotation of the first blades 12 of the main rotor 11 and of the second blades 14 of the anti-torque rotor 13 when the coupling mechanism 22, 22' is engaged.

The control device 1 for controlling a coupling mechanism 22, 22' comprises first determination means 3 for determining the state of each engine 21, 21', second determination means 5 for determining a "ready to engage" state for each coupling mechanism 22, 22', third determination means 4 for determining a maximum torque that can be accepted by the MGB 23, and control means 2 for controlling engagement of the coupling mechanism 22, 22' associated with each engine 21, 21'.

Figure 5:
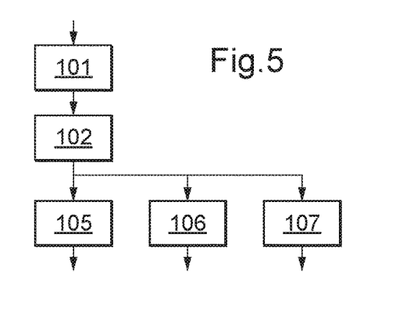
FIGS. 5 to 7 are three flowcharts showing a method of controlling a coupling mechanism.
Figure 6:
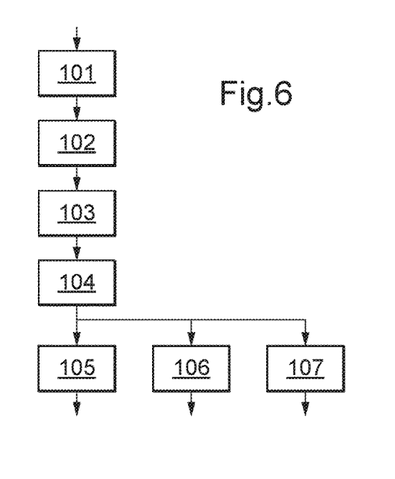
Figure 7:
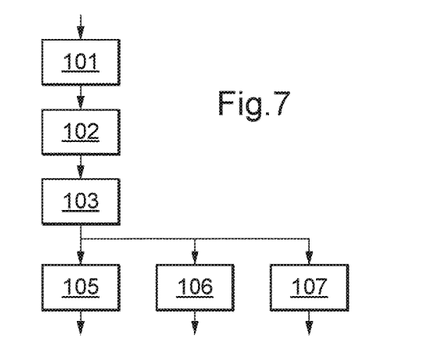

The power plants 20 shown in FIGS. 2 to 4 are associated with respective implementations of a control method for controlling a coupling mechanism 22, 22', which implementations are summarized diagrammatically in FIGS. 5 to 7 respectively.

A first power plant 20 is shown in FIG. 2 and comprises an engine 21, which is a piston engine, a control system 24 for the piston engine 21, a coupling mechanism 22 arranged between the outlet shaft 25 of the piston engine 21 and the inlet shaft 26 of the MGB 23, and a control device 1 for controlling the coupling mechanism 22. The control device 1 for controlling the coupling mechanism 22 may perform the implementation of the method summarized diagrammatically in FIG. 5, which implementation comprises five steps.

The first determination means 3 comprise a first sensor 31 for taking a first measurement giving the speed of rotation of the outlet shaft 25 of the piston engine 21, a second sensor 32 for taking a second measurement giving the temperature of a cooling liquid of the piston engine 21, and a third sensor 33 for taking a third measurement giving the temperature of a lubrication liquid of the piston engine 21.

Thus, during the first step 101 of determining a state of the piston engine 21, the first determination means 3 deliver the first measurement giving the speed of rotation of the outlet shaft 25 of the piston engine 21, the second measurement giving the temperature of the cooling liquid of the piston engine 21, and the third measurement giving the temperature of the lubrication liquid of the piston engine 21, thereby characterizing a state of the piston engine 21.

The second determination means 5 comprise a comparator 51 for comparing the first measurement giving the speed of rotation of the outlet shaft 25 of the piston engine 21 with a setpoint speed of rotation for the outlet shaft 25, for comparing the second measurement giving the temperature of the cooling liquid of the piston engine 21 with a first range of operating temperatures, and for comparing the third measurement giving the temperature of the lubrication liquid of the piston 21 with a second range of operating temperatures.

Thus, during the second step 102 of determining the "ready to engage" state, the second determination means 5 deliver the "ready to engage" state for the coupling mechanism 22 when simultaneously the difference between the first measurement giving the speed of rotation of the outlet shaft 25 and the setpoint speed of rotation is less than or equal to a first threshold, the second measurement giving the temperature of the cooling liquid of the piston engine 21 lies in the first operating temperature range, and the third measurement giving the temperature of the lubrication liquid of the piston engine 21 lies in the second operating temperature range.

Once this "ready to engage" state is delivered, the following three steps 105, 106, and 107 are performed simultaneously.

The third determination means 4 have a fourth sensor 41 for sensing temperature and a fifth sensor 42 for sensing pressure serving respectively to take a fourth measurement giving the temperature and a fifth measurement giving the pressure of the lubrication liquid of the MGB 23. The third determination means 4 also include a computer 44 and a memory 45.

Figure 8:
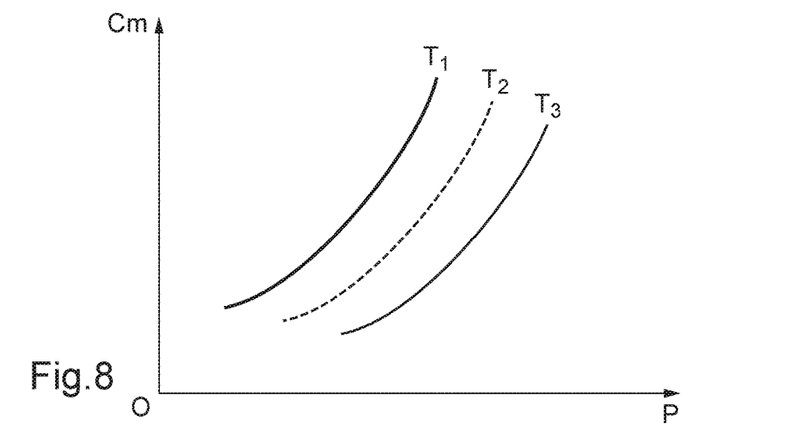
FIG. 8 is a graph showing the maximum torque that can be accepted by the MGB.

Thus, during the third step 105 of determining the maximum torque that can be accepted by the MGB 23, the third determination means 4 begin by delivering a fourth measurement giving the temperature and a fifth temperature giving the pressure of the lubrication liquid of the MGB 23. Thereafter, the computer 44 calculates the maximum torque that can be accepted by the MGB 23 as a function of the fourth measurement giving the temperature, of the fifth measurement giving the pressure of the lubrication liquid of the MGB 23, and as a function of the results of tests, as represented by the graph of FIG. 8.

This graph shows curves characterizing variation in the maximum acceptable torque Cm (plotted up the ordinate axis) as a function of the pressure P of the lubrication liquid of the MGB 23 (plotted along the abscissa axis), each curve being characterized by a respective temperature (T1, T2, T3) of the lubrication liquid of the MGB 23. Thus, knowing the fourth measurement giving the temperature and the fifth measurement giving the pressure of the lubrication liquid of the MGB 23, the third determination means 4 determine the maximum torque that can be accepted by the MGB 23. Each curve is stored in the memory 45.

The control means 2 for controlling engagement of the coupling mechanism 22 are constituted by a computer for controlling the coupling mechanism 22 in order to engage the piston engine 21 with the MGB 23 automatically. The coupling mechanism 22 includes action means (not shown) to perform this engagement automatically. The action means may for example be a hydraulic actuator for moving together movable components, such as disks, of the coupling mechanism 22.

Specifically, in parallel with the third step 105 and during the fourth step 106 of engaging the coupling mechanism 22, the control means 2 control the action means, and consequently automatic engagement of the coupling mechanism 22, thereby engaging the outlet shaft 25 of the piston engine 21 with the inlet shaft 26 of the MGB 23.

The control system 24 serves to regulate the speed of rotation of the outlet shaft 25 of the piston engine 21 as a function of the setpoint speed of rotation for the outlet shaft 25 and to control the torque delivered by the piston engine 21 so that it is less than or equal to the maximum torque that can be accepted by the MGB 23.

As a result, in parallel with the third step 105 and with the fourth step 106, and during a fifth step 107 of regulating the piston engine 21, the control system 24 regulates the speed of rotation of the outlet shaft 25 of the piston engine 21 in compliance with the setpoint speed of rotation, while also controlling the torque delivered by the piston engine 21 so that it remains less than or equal to the maximum torque that can be accepted by the MGB 23, as defined beforehand.

The control means 2 serve to control engagement of the coupling mechanism 22 by controlling the speed of engagement as a function of the speed of rotation of the piston engine 21 and the setpoint speed of rotation for the piston engine 21. The control means 2 thus serve to optimize the time required for engagement so as to minimize the time between starting the piston engine 21 and takeoff of the aircraft 10 without requiring action on the part of its pilot. Advantageously, the device 1 for controlling the coupling mechanism 22 also serves to guarantee that the piston engine 21, the coupling mechanism 22, and the MGB 23 are not degraded by controlling the operation of the piston engine 21 via the control system 24.

A second power plant 20 is shown in FIG. 3 and comprises two engines 21 and 21', which are linked-turbine engines, two control systems 24 and 24' connected to respective ones of the engines 21 and 21', two coupling mechanism 22 and 22', and a control device 1 for controlling the coupling mechanisms 22 and 22'. The control device 1 includes information means 7, such as an indicator light and action means 8 such as a pushbutton that are positioned on the instrument panel 16 and it serves to perform the implementation of the method shown diagrammatically in FIG. 6, which implementation has seven steps.

The first determination means 3 comprise only two first sensors 31 and 31' for taking first measurements giving the speeds of rotation of the respective outlet shafts 25 and 25' of each of the engines 21 and 21'.

Thus, during the first step 101 of determining the states of the engines 21 and 21', the first determination means 3 deliver first measurements of the speeds of rotation of the outlet shafts 25 of each of the engines 21 and 21', thereby enabling the state of each engine 21, 21' to be characterized and determining its operating conditions.

The second determination means 5 comprise a comparator for comparing the first measurements giving the speeds of rotation of the outlet shafts 25 of each of the engines 21 and 21' with setpoint speeds of rotation for those outlet shafts 25.

Thus, during the second step 102 of determining a "ready to engage" state, the second determination means 5 deliver the "ready to engage" state for the coupling mechanisms 22 and 22' when the differences between the first measurements of the speeds of rotation and the corresponding setpoint speeds of rotation are less than or equal to a first threshold.

As soon as this "ready to engage" state is delivered, "ready to engage" information is supplied to a pilot of the aircraft 10 by lighting the indicator light 7 during the additional step 103 of supplying the "ready to engage" information.

Thereafter, during a second additional step 104 of activating an order to engage the coupling mechanisms 22 and 22', the pilot chooses the instant for starting the operation of engaging the coupling mechanisms 22 and 22' by pressing on the pushbutton 8, after taking cognizance of the "ready to engage" information.

As soon as the pilot presses on the pushbutton 8, the following three steps 105, 106, and 107 are performed simultaneously.

The third determination means 4 for determining the maximum torque that can be accepted by the MGB 23 are provided with a fourth sensor 41 and with a sixth sensor 43 for taking respectively a fourth measurement and a sixth measurement giving the temperature of the lubrication liquid of the MGB 23 and the speed of rotation of the MGB 23. The third determination means 4 also include a computer 4 and a memory 45.

Thus, during the third step 105 of determining the maximum torque that can be accepted by the MGB 23, the third determination means 4 begin by delivering a fourth measurement giving the temperature of the lubrication liquid of the MGB 23 and a sixth measurement giving the speed of rotation of the MGB 23. Thereafter, the computer 44 determines the maximum torque that can be accepted by the MGB 23 as a function of the fourth measurement giving the temperature and the sixth measurement giving the speed of rotation of the MGB 23, and as a function of the results of tests, e.g. using a graph equivalent to that of FIG. 8.

Figure 9:
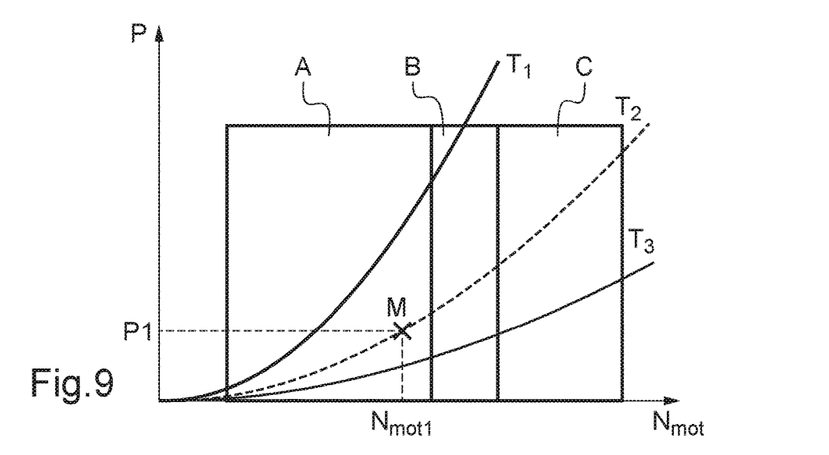
FIG. 9 is a graph that makes it possible to deduce the maximum torque that can be accepted by the MGB.

Furthermore, during the third step 105, the maximum torque acceptable by the MGB 23 can also be calculated as a function of the fourth measurement giving the temperature, of the fifth measurement giving the pressure of the lubrication liquid of the MGB 23, of the speed of rotation Nmot of the outlet shaft 25 of the engine 21, and of the results of tests as shown by the graph of FIG. 9.

This graph shows curves characterizing variation in the pressure P of the lubrication liquid of the MGB 23 (plotted up the ordinate axis) as a function of the speed of rotation Nmot of the outlet shaft 25 of the engine 21 (plotted along the abscissa axis), with each curve being characterized by a temperature (T1, T2, T3) of the lubrication liquid of the MGB 23. This graph also defines zones A, B, and C. Each zone A, B, and C is associated with a maximum torque that can be accepted by the MGB 23.

Thus, a point M characterized by a fourth measurement giving the temperature T2 and a fifth measurement giving the pressure P1 of the lubrication liquid of the MGB 23 and also by a speed of rotation Nmot1 of the outlet shaft 25 of the engine 21 lies on the graph in the zone A. The third determination means 4 then determining the maximum torque that can be accepted by the MGB 23 corresponding to this zone A. Each curve is stored in the memory 45.

As above, the control means 2 for controlling engagement of the coupling mechanisms 22 and 22' is constituted by a computer 44 serving to control the coupling mechanisms 22 and 22', and each coupling mechanism 22, 22' includes action means (not shown) in order to implement coupling automatically.

Specifically, in parallel with the third step 105 and during the fourth step 106 of engaging the coupling mechanisms 22 and 22', the control means 2 control the action means, and consequently cause the coupling mechanisms 22 and 22' to engage automatically, thereby engaging the outlet shafts 25 of each of the engines 21 and 21' with respective inlet shafts 26 of the MGB 23.

As above, the control system 24 serves to regulate the speeds of rotation of the outlet shafts 25 of the engines 21, 21' on respective setpoint speeds of rotation for the outlet shafts 25 and to control the torque delivered by each engine 21 and 21' so that it is less than or equal to the maximum torque that can be accepted by the MGB 23.

As a result, in parallel with the third step 105 and with the fourth step 106 and during a fifth step 107 of regulating the engines 21 and 21', the control system 24 regulates the speed of rotation of the outlet shaft 25 of each engine 21, 21' on the setpoint speed of rotation, while ensuring that the torque delivered by each engine 21, 21' remains less than or equal to the maximum torque acceptable by the MGB 23, as defined beforehand.

The control means 2 serve to control engagement of the coupling mechanisms 22 and 22' by controlling an engagement speed as a function of the torque delivered by each engine 21, 21' and of the maximum torque acceptable by the MGB 23. The control means 2 thus serve to optimize the lifetimes of the engines 21, 21', of the coupling mechanisms 22, 22', and of the MGB 23 by controlling the operation of the engines 21, 21' via the control system 24, and in particular by controlling the torque delivered by each engine 21, 21' to ensure that it is less than or equal to the maximum torque acceptable by the MGB 23.

In this second power plant 20 having two engines 21 and 21', it should be observed that the engagement of the two coupling mechanisms 22 and 22' may be simultaneous or sequential. If the two coupling mechanisms 22 and 22' are engaged simultaneously, then it is the sum of the torques delivered by each of the engines 21 and 21' that needs to be less than or equal to the maximum torque acceptable by the MGB 23. In contrast, it is possible for the two coupling mechanisms 22 and 22' to be engaged sequentially, e.g. when only a first engine 21 has started, and is then engaged with the MGB 23. Thereafter, the second engine 21' is engaged with the MGB 23 in order to be started. Under such circumstances, when the first engine 21 is engaged with the MGB 23, it is the torque delivered by that first engine 21 alone that needs to be less than or equal to the maximum torque acceptable by the MGB 23.

A third power plant 20 is shown in FIG. 4 and comprises a single linked-turbine engine 21, a control system 24 for the engine 21, a coupling mechanism 22, and a control device 1 for controlling the coupling mechanism 22. The control device 1 has a screen 7 and an engagement lever 9 positioned on the instrument panel 16 and is suitable for performing the implementation of the method that is shown diagrammatically in FIG. 7 and that comprises six steps.

The first determination means 3 comprise only a first sensor 31 for taking a first measurement of the speed of rotation of the outlet shaft 25 of the engine 21. Specifically, during the first step 101, the first determination means 3 deliver the first measurement of the speed of rotation of this engine 21, enabling the state of the engine 21 to be characterized and enabling its operating conditions to be determined.

The second determination means 5 are identical to the second determination means of the second power plant 20. Likewise, the second step 102 is identical to the second step 102 performed by the second power plant 20.

As soon as a "ready to engage" state is delivered, "ready to engage" information is supplied to a pilot of the aircraft 10 by displaying a message on the screen 7 during the additional step 103 of supplying the "ready to engage" information.

Thereafter, during the fourth step 106 of engaging the coupling mechanism 22, the pilot acts manually on the engagement lever 9 to couple the coupling mechanism 22, once the pilot has taken cognizance of the "ready to engage" information. The control means 2 for controlling engagement of the coupling mechanism 22 comprise the engagement lever 9 and transfer means 91 connecting the engagement lever 9 with the coupling mechanism 22.

Nevertheless, the pilot needs only to manage the progress of the engagement of the coupling mechanism 22, the engine 21 itself being controlled and regulated as above by the control system 24 during a fifth step 107 of regulating the engine 21, performed in parallel with the fourth step 106.

Furthermore, in parallel with the fourth step 106 and with the fifth step 107, and during the third step 105 of determining the maximum torque acceptable by the MGB 23, the third determination means 4 for determining the maximum torque acceptable by the MGB 23 is provided solely with a fifth sensor 42 for taking a fifth measurement giving the pressure of the lubrication liquid of the MGB 23. The third determination means 4 also include a computer 44 and a memory 45.

Thus, during the third step 105 of determining the maximum torque acceptable by the MGB 23, the third determination means 4 begin by delivering a fifth measurement giving the pressure of the lubrication liquid of the MGB 23. Thereafter, the computer 44 determines the maximum torque acceptable by the MGB 23 as a function of the fifth measurement. This maximum acceptable torque is equal to a torque that is reduced when the fifth measurement is less than or equal to a fourth threshold and the maximum acceptable torque is equal to a maximum for when the fifth measurement is greater than the fourth threshold. The values for the reduced torque, for the maximum torque, and for the torque threshold are stored in the memory 45.

Naturally, the present invention may be subjected to numerous variations as to its implementation. Although several embodiments and implementations are described, it will readily be understood that it is not conceivable to identify exhaustively all possible embodiments and implementations. It is naturally possible to envisage replacing any of the means described by equivalent means without going beyond the ambit of the present invention.

What is claimed is:

1. A control method for controlling a coupling mechanism between an engine and a main mechanical power transmission gearbox MGB for an aircraft, the coupling mechanism enabling an outlet shaft of the engine to be engaged with an inlet shaft of the MGB, wherein the control method comprises the following steps:
    determining the state of an engine including taking a first measurement giving the speed of rotation of the engine;
    determining a "ready to engage" state for the coupling mechanism associated with the engine;
    engaging the coupling mechanism associated with the engine;
    determining a maximum torque acceptable by the MGB; and
    regulating the engine so that the speed of rotation of the engine is regulated on a setpoint speed of rotation for the engine, while controlling the torque delivered by the engine so that it is less than or equal to the maximum torque acceptable by the MGB during the step of engaging the coupling mechanism.

2. A method according to claim 1, wherein the method includes an additional step of supplying "ready to engage" information as soon as the "ready to engage" state is determined, the step of supplying "ready to engage" information being performed between the step of determining a "ready to engage" state and the step of engaging the coupling mechanism, the step of engaging the coupling mechanism then being performed manually by a pilot using an engagement lever arranged in a cockpit of the aircraft.

3. A method according to claim 1, wherein the method includes various additional steps situated between the step of determining a "ready to engage" state and the step of engaging the coupling mechanism, the additional steps comprising:
    information means of the aircraft supplying "ready to engage" information as soon as the "ready to engage" state is determined; and
    a pilot activating an engagement order for the coupling mechanism, the engagement of the coupling mechanism then being performed automatically.

4. A method according to claim 1, wherein the step of engaging the coupling mechanism is performed automatically as soon as the "ready to engage" state is determined.

5. A method according to claim 4, wherein the step of engaging the coupling mechanism is performed by regulating a speed of engagement as a function of the first measurement giving the first speed of rotation of the engine and as a function of the setpoint speed of rotation for the engine.

6. A method according to claim 4, wherein the step of engaging the coupling mechanism is performed by regulating a speed of engagement as a function of the torque delivered by the engine and of the maximum torque acceptable by the MGB.

7. A method according to claim 1, wherein the step of determining a "ready to engage" state for the coupling mechanism delivers the "ready to engage" state when the difference between the first measurement giving the first speed of rotation of the engine and the setpoint speed of rotation for the engine is less than or equal to a first threshold.

8. A method according to claim 1, wherein the step of determining a state of an engine includes taking a second measurement giving the temperature of a cooling liquid of the engine and a third measurement giving the temperature of a lubrication liquid of the engine, and the step of determining a "ready to engage" state for the coupling mechanism delivers the "ready to engage" state when the difference between the first measurement giving the speed of rotation of the engine and a setpoint speed of rotation of the engine is less than or equal to a first threshold, the second measurement giving the temperature of the cooling liquid of the engine is situated in a first range of operating temperatures, and the third measurement giving the temperature of the lubrication liquid of the engine is situated in a second range of operating temperatures.

9. A method according to claim 1, wherein during the step of determining the maximum torque acceptable by the MGB, a fourth measurement is taken giving the temperature of a lubrication liquid of the MGB, and a fifth measurement is taken giving the pressure of the lubrication liquid of the MGB, and the maximum acceptable torque is determined as a function of the fourth measurement giving the temperature of the lubrication liquid of the MGB, of the fifth measurement giving the pressure of the lubrication liquid of the MGB, and of the results of tests.

10. A method according to claim 1, wherein during the step of determining the maximum torque acceptable by the MGB, a fourth measurement is taken giving the temperature of a lubrication liquid of the MGB, and a sixth measurement is taken giving a speed of rotation of the MGB, and then the maximum acceptable torque is determined as a function of the fourth measurement giving the temperature of the lubrication liquid of the MGB, of the sixth measurement giving the speed of rotation of the MGB, and of the results of tests.

11. A method according to claim 1, wherein during the step of determining the maximum torque acceptable by the MGB, a fifth measurement is taken giving the pressure of the lubrication liquid of the MGB, and then the maximum acceptable torque is determined as a function of the fifth measurement giving the pressure of the lubrication liquid of the MGB, the maximum acceptable torque being equal to a reduced torque if the fifth measurement giving the pressure of the lubrication liquid of the MGB is less than or equal to a fourth threshold and the maximum acceptable torque being equal to a maximum torque if the fifth measurement giving the pressure of the lubrication liquid of the MGB is greater than the fourth threshold.

12. A device for controlling a coupling mechanism between an engine and a main mechanical power transmission gearbox MGB for an aircraft, the aircraft having at least one engine, a respective control system for each engine, an MGB, and at least one coupling mechanism, there being a respective coupling mechanism arranged between each engine and the MGB for engaging an outlet shaft of the engine with a respective inlet shaft of the MGB, the device for controlling the coupling mechanism comprising:

first determination means for determining the state of the engine and having a first sensor for taking a first measurement giving the speed of rotation of the engine;
second determination means for determining a "ready to engage" state for the coupling mechanism;
third determination means for determining a maximum torque that can be accepted by the MGB; and
control means for controlling the engagement of the coupling mechanism associated with the engine;
each control system of the engine being designed to regulate the speed of rotation of the engine on a setpoint speed of rotation for the engine while controlling the torque delivered by the engine so that it is less than or equal to the maximum torque acceptable by the MGB during the engagement of the coupling mechanism.

13. A device according to claim 12, wherein the control means enable the coupling mechanism to be engaged automatically as soon as the "ready to engage" state is determined.

14. A device according to claim 12, wherein the device includes information means and action means arranged in a cockpit of the aircraft, the information means providing "ready to engage" information as soon as the "ready to engage" state is determined, the control means engaging the coupling mechanism to be engaged automatically as soon as the "ready to engage" state is determined and as soon as the action means are actuated.

15. A device according to claim 12, wherein the device includes information means and the control means include an engagement lever, the information means and the engagement lever being arranged in a cockpit of the aircraft, the information means providing "ready to engage" information as soon as the "ready to engage" state is determined, the engagement lever being actuated manually in order to engage the coupling mechanism.

16. A device according to claim 12, wherein the first determination means for determining a state of the engine are provided with second and third sensors for taking respectively a second measurement giving the temperature of a cooling liquid of the engine and a third measurement giving the temperature of a lubrication liquid of the engine.

17. A device according to claim 12, wherein the third determination means for determining the maximum torque acceptable by the MGB has a fourth sensor for sensing temperature and a fifth sensor for sensing pressure to provide respectively a fourth measurement giving the temperature of a lubrication liquid of the MGB and a fifth measurement giving the pressure of the lubrication liquid of the MGB.

18. A device according to claim 12, wherein the third determination means for determining the maximum torque acceptable by the MGB have a fourth sensor for sensing temperature and a sixth sensor for sensing speed to take respectively a fifth measurement giving the temperature of a lubrication liquid of the MGB and a sixth measurement giving the speed of rotation of the MGB.

19. A device according to claim 12, wherein the third determination means for determining the maximum torque acceptable by the MGB have a fifth sensor for sensing pressure to take a fifth measurement giving the pressure of the lubrication liquid of the MGB, the maximum acceptable torque being equal to a reduced torque if the fifth measurement giving the pressure of the lubrication liquid of the MGB is less than or equal to a fourth threshold, and the maximum acceptable torque being equal to a maximum torque if the fifth measurement giving the pressure of the lubrication liquid of the MGB is greater than the fourth threshold.

20. A power plant for an aircraft, the power plant having at least one engine, a control system for each engine, an MGB, at least one coupling mechanism, and a device for controlling each coupling mechanism, a respective coupling mechanism being arranged between each engine and the MGB, and serving to engage an outlet shaft of each engine with a respective inlet shaft of the MGB, wherein the device for controlling the coupling mechanism is a device according to claim 12.

* * * * *